United States Patent [19]

Minefuji et al.

[11] Patent Number: 5,066,987

[45] Date of Patent: Nov. 19, 1991

[54] SHADING BOARD FOR COPYING APPARATUS

[75] Inventors: Nobutaka Minefuji, Fujimi; Yasunori Arai, Saitama, both of Japan

[73] Assignee: Asahi Kogaku Kogyo Kabushiki Kaisha, Tokyo, Japan

[21] Appl. No.: 450,468

[22] Filed: Dec. 14, 1989

[30] Foreign Application Priority Data

Dec. 19, 1988 [JP] Japan ............ 63-319905

[51] Int. Cl.[5] ............ G03G 15/04; G03B 27/50

[52] U.S. Cl. ............ 355/233; 355/243; 355/55; 355/71

[58] Field of Search ............ 355/228, 232, 243, 71, 355/55-57, 67, 233

[56] References Cited

U.S. PATENT DOCUMENTS

| | | | |
|---|---|---|---|
| 4,095,884 | 6/1978 | Okamoto et al. | 355/210 |
| 4,125,323 | 11/1978 | Ikeda et al. | 355/235 |
| 4,243,312 | 1/1981 | Ogawa | 355/233 |
| 4,260,249 | 4/1981 | Armitase, Jr. et al. | 355/57 X |

FOREIGN PATENT DOCUMENTS

| | | | |
|---|---|---|---|
| 52-155523 | 12/1977 | Japan . | |
| 57-68869 | 4/1982 | Japan . | |
| 57-68872 | 4/1982 | Japan . | |
| 57-92348 | 6/1982 | Japan . | |
| 57-158667 | 9/1982 | Japan . | |
| 57-157959 | 10/1982 | Japan . | |
| 57-57701 | 12/1982 | Japan . | |
| 57-195150 | 12/1982 | Japan . | |
| 59-5858 | 2/1984 | Japan . | |
| 59-37535 | 3/1984 | Japan . | |
| 59-78330 | 5/1984 | Japan . | |
| 60-123832 | 7/1985 | Japan . | |
| 60-134226 | 7/1985 | Japan | 355/71 |
| 61-75334 | 4/1986 | Japan . | |
| 61-75335 | 4/1986 | Japan . | |

*Primary Examiner*—Joan H. Pendegrass
*Attorney, Agent, or Firm*—Sandler, Greenblum & Bernstein

[57] ABSTRACT

In an electrophotographic copying apparatus, reflected light from an original subject is directed to a light receiving means, such as a photoconductive drum, through a slit. The apparatus includes an optical device, for example a zoom lens, positioned between the original subject and the photoconductive drum for varying the size of the optical image being passed through the slit. A shading board fixed adjacent to the photoconductive drum extends along a longitudinal direction of the optical image.

7 Claims, 5 Drawing Sheets

SHADING BOARD FOR COPYING APPARATUS

BACKGROUND OF THE INVENTION

This invention relates to a copying apparatus capable of copying an image of an original subject in either a reduced or magnified size as well as in a size equal to that of the original.

Conventionally, in a copying apparatus, zoom lenses have been employed in the optical system for projecting an optical image onto the surface of a photoconductive drum. In this case, an effective F number is determined in accordance with a magnifying power of the lens. The amount of light of a magnified optical image is almost equal to that of one of equal size one at the center of the optical axis on the circumferential surface of a photoconductive drum as shown in FIG. 8. On the other hand, the amount of light of a reduced optical image is more than that of the equal-sized or magnified image at the center of the optical axis on the circumferential surface of the photoconductive drum.

To correct the above nonuniformity in the light amounts of the projected images, it has been proposed in Japanese Patent Provisional Publication SH060-134226 that a light shading board can be located adjacent to the lens. The light shading board can be moved toward and away from the surface of the photoconductive drum, along the optical axis, in a manner corresponding to the magnification/reduction ratio of the image to be projected by the optical system. In the copying machine employing the above-described light shading board, when a light distribution on the surface of the photoconductive drum in its axial direction is made uniform by correcting the illumination characteristic of the light directed to the original subject for equal-sized copying, the light distribution characteristic on the surface of the photoconductive drum in its axial direction at reduced size copying and at magnified size copying are as (shown in FIG. 9. That is, at reduced copying (see examples of 0.5X, 0.7X), the brightness of the longitudinal edges of the projected image field is relatively high. However, magnified size copying (see examples of 1.42X, 2.0X), the brightness of the longitudinal edges of the projected image field is relatively low.

In conventional copying machines, the magnification range is set at about from 1.24 to 0.7 of the original size. In the above magnification range, the nonuniformity in the amounts of light of the projected image influences the quality of the image negligibly and thus there causes no problem.

Recently, however, the magnification range has been broadened to extend from 2.0 to 0.5 of the original size, which makes it necessary to correct for the nonuniformity in the amount of light, especially for reduced copying.

To correct this nonuniformity in the amount of light of the projected image in the longitudinal direction of the photoconductive drum, it has been further proposed to locate a light shading board between the lens and the photoconductive drum depending upon the magnifying power of the lens, as disclosed in Japanese Patent Provisional Publication SHO57-68872.

The above copying machine, however, must be constructed as that the light shading board is movable, which makes it necessary to employ a driving device for the light shading board. Therefore, manufacture of the copying machine becomes complicated.

SUMMARY OF THE INVENTION

It is therefore an object of the invention to provide an improved copying apparatus employing a device capable of correcting the amount of light, and further to a copying apparatus employing such a device capable of correcting both for the nonuniformity in the amount of light due to range and due to variations along the axial direction of the drum with a single element.

For this purpose, according to this invention, there is provided an electrophotographic copying apparatus wherein light reflected from an original subject is directed to a light receiving means through a slit, which comprises:

optical means provided between the original subject and the light receiving means for varying the size of the reflected light being passed through said slit; and a shading member fixed at a predetermined position between the optical means and the light receiving means along a longitudinal direction of the optical image.

DESCRIPTION OF THE ACCOMPANYING DRAWING

Figure 8:
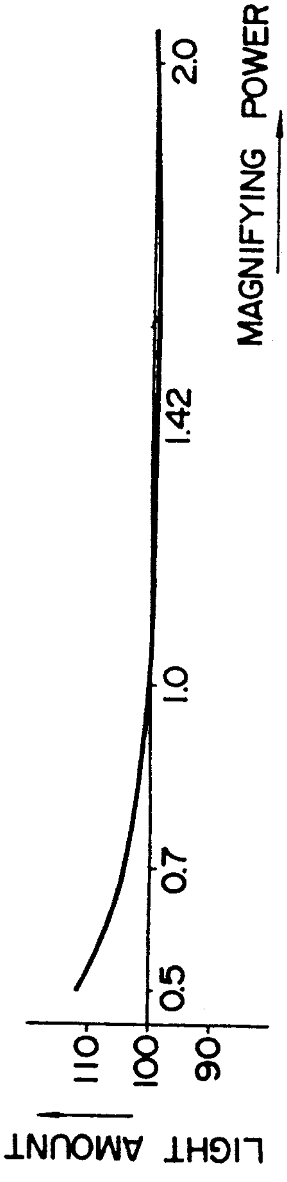
Figure 9:
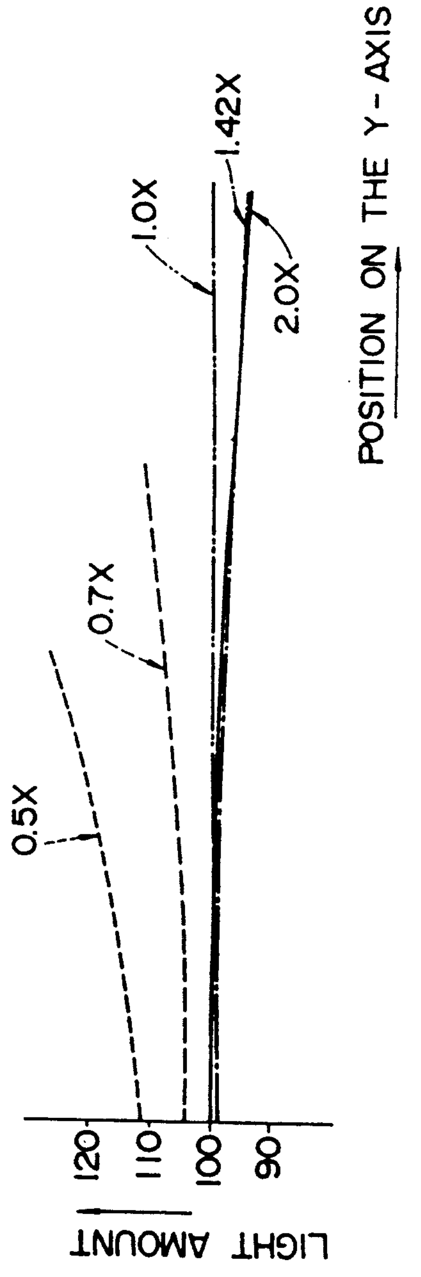

FIG. 8 is a graph showing amount of light characteristics at the center of the optical axis of a zoom lens; and FIG. 9 is a graph showing light distribution characteristics, wherein the illumination of the original subject is set so that the light distribution on the surface of the photoconductive drum is uniform for equal-sized copying, and the light amount is set to be 100 on the surface of the photoconductive drum for center of the optical axis at the equal-sized copying.

DESCRIPTION OF THE EMBODIMENTS

Figure 1:
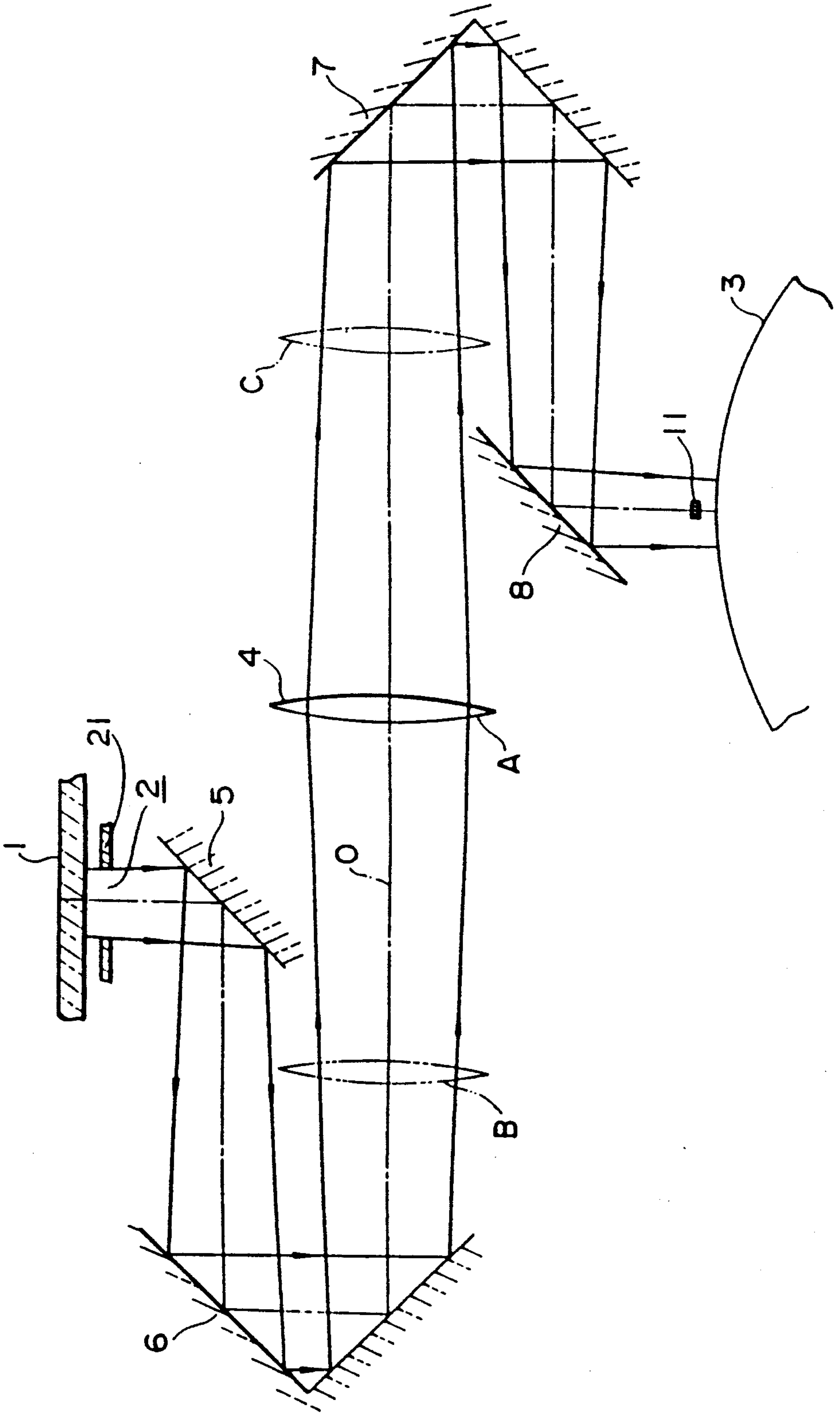
FIG. 1 shows a schematic side view illustrating an optical system of a copying apparatus embodying the invention.
Figure 2:
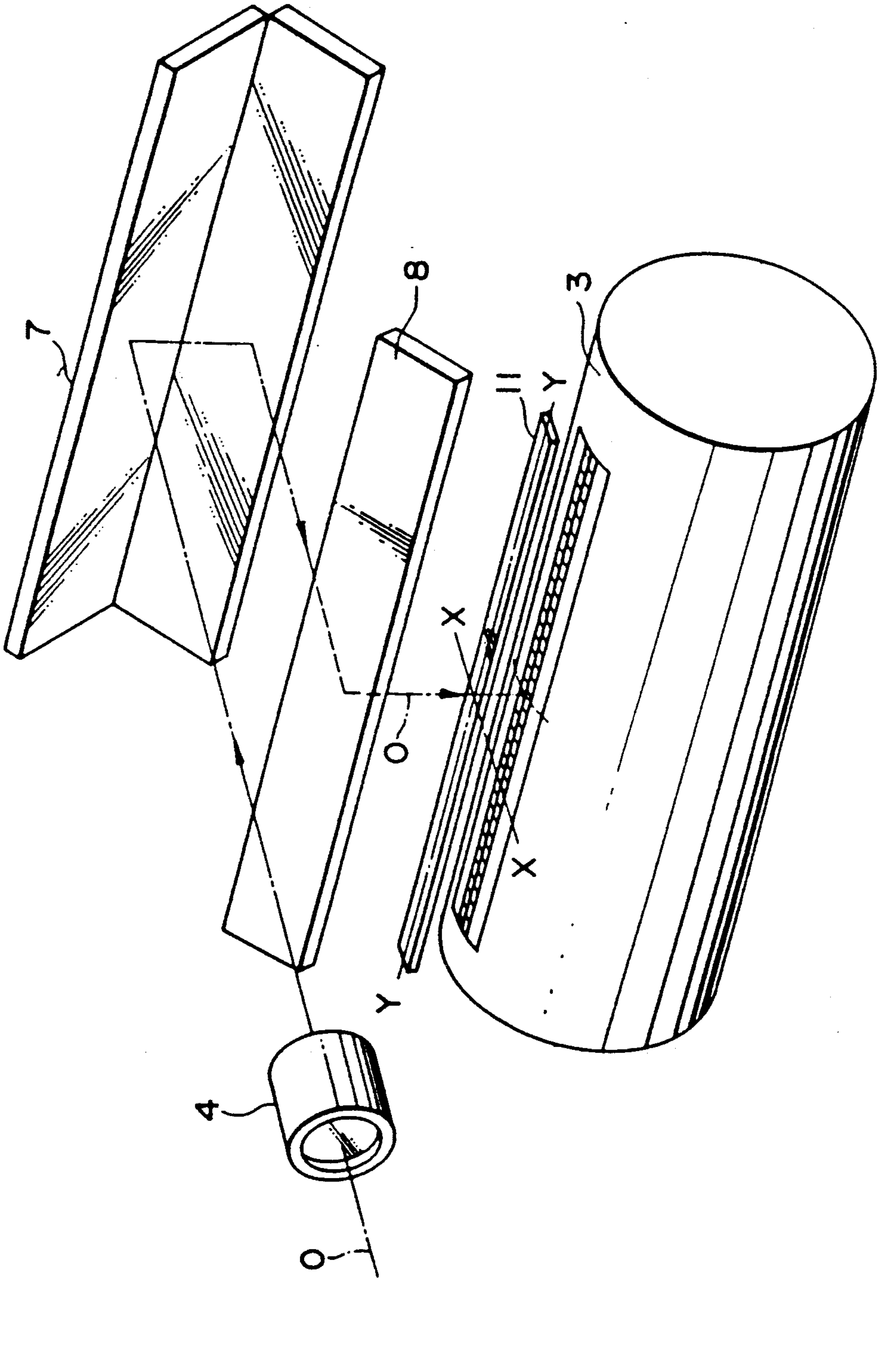
FIG. 2 shows a perspective side view of principal parts of the copying apparatus.

FIG. 1 shows a schematic side view of a principal parts of a copying apparatus embodying this invention. The copying apparatus includes a movable glass plate 1, on which an original subject, not shown, to be copied is placed, a photoconductive drum 3 and a lens 4. A slit plate 21 having a slit 2 extending in a direction transverse to the direction of the movement of the glass plate, is positioned below the glass plate 1.

The original subject on the glass plate 1 is illuminated with light projected from a light source, not shown. The distribution of the light projected to the original subject is made become uniform on the surface of the photoconductive drum 3 for the equal-sized copying.

The reflected light from the illuminated original subject forms an optical image on the circumferential surface of the photoconductive drum 3 by way of the slit 2, a first mirror 5, second mirrors 6, third mirrors 7 and a fourth mirror 8.

The lens 4 is movably disposed along the optical axis thereof with a commonly-known construction so as to form various sizes of the optical image of the original subject. When the lens 4 is located at the position "A" in FIG. 1, the optical image formed and projected onto the surface of the photoconductive drum 3 is the same size as the original; when the lens 4 is located at "B", the projected image becomes twice the original size; and when the lens 4 is located at "C", the projected image becomes one half the original size.

The lens 4 utilized in this embodiment consists of a two-group zoom lens.

Figure 3:
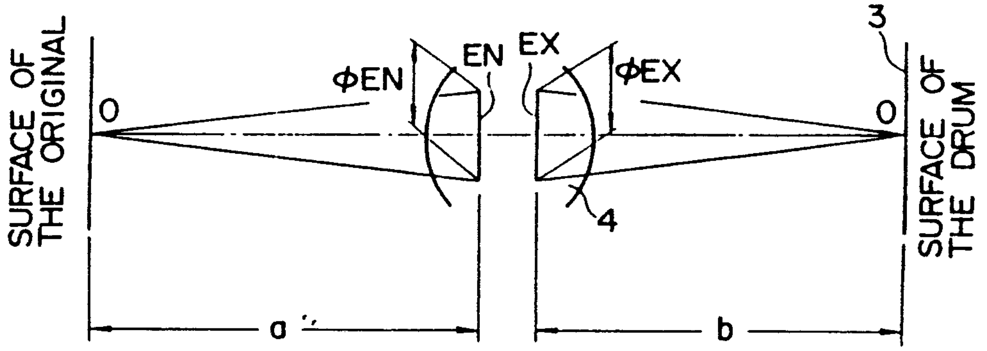
FIG. 3 is a diagram illustrating the relative positional relationship among a lens, an original subject and a surface of a photoconductive drum.

Table 1 shows the lens data for a lens of focal length "F", f-number "f", the distance "a" between the original subject and an entrance pupil "EN", the distance "b" between an exit pupil "EX" and the circumferential surface of the photoconductive drum 3, the diameter "φEN" of the entrance pupil "EN", and the diameter "φEX" of the exit pupil "EX"; wherein the maximum size of the projected image on the surface of the photoconductive drum 3 is set 300 mm in width in accordance with the A3 paper size (refer to FIG. 3).

TABLE 1

| | F | f-No. | a | b | φEN | φEX |
|---|---|---|---|---|---|---|
| 2.0 x | 169.8 | 6.64 | 290.6 | 478.8 | 25.9 | 21.3 |
| 1.42 x | 186.8 | 7.30 | 346.0 | 427.9 | 25.9 | 22.5 |
| 1.0 x | 193.1 | 7.55 | 410.7 | 364.2 | 25.9 | 22.9 |
| 0.7 x | 186.6 | 7.30 | 480.9 | 292.9 | 25.9 | 22.5 |
| 0.5 x | 169.8 | 6.64 | 545.2 | 224.7 | 25.9 | 21.3 |

A light shading member 11, is provided between the fourth mirror 8 and the photoconductive drum 3. The light shading member 11 comprise a broad member located perpendicular to an optical axis "O" of the optical image and extended along the axial direction of the drum 3. Both longitudinal edges of the member 11 are fixed to the frame or the like, not shown, of the copying apparatus.

Figure 4:
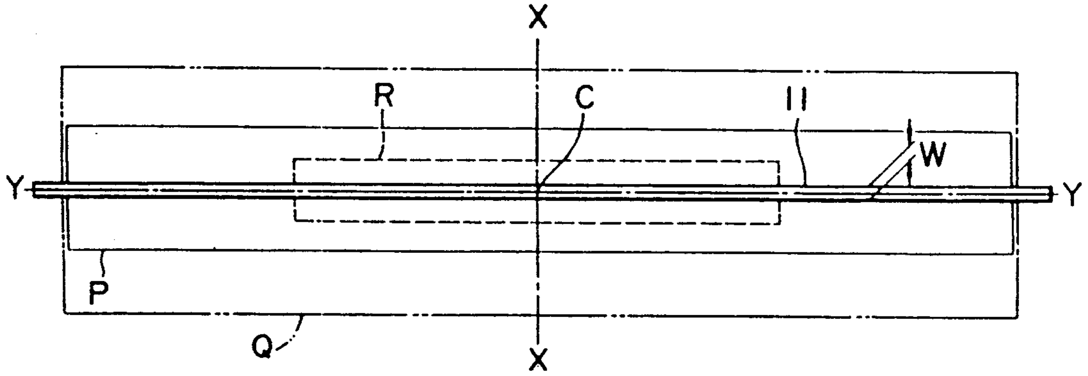
FIG. 4 shows a plan view of a shading member employed in the copying apparatus.

In FIG. 4, a line "Y—Y" shows a coordinate axis parallel to the axial direction of the rotary center of the photoconductive drum 3, a line "X—X" is a coordinate axis crossing the axis "Y—Y" at a right angle at the center "C" of the longitudinal length of the photoconductive drum 3. At the crossing point "C" of the axis "X—X" and the axis "Y—Y", the optical axis "O" crosses perpendicular to the plane including the axes "X—X" and "Y—Y".

In FIG. 4, a rectangle drawn by solid lines shows a projected slit image "P" for equal sized copying; a rectangle drawn with chain lines is a projected slit image "Q" at the double-sized copying; and a rectangle drawn with broken lines is a slit image "R" at the half-sized copying: the crossing point "C" is the center of each slit images "P", "Q" and "R".

Figure 6:
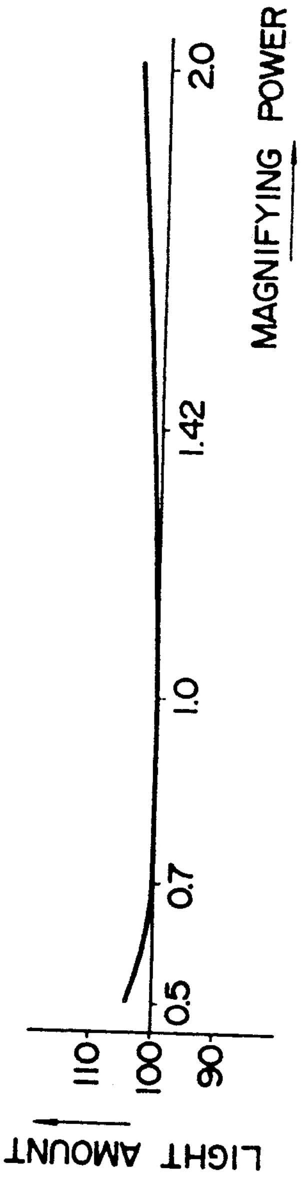
FIG. 6 is a graph showing variation in the amount of characteristics at the center of the ratio optical axis for various magnification ratios employing the shading member shown in FIG. 4.

In this embodiment, the width of the slit 2 is 20 mm. The shading member 11 is located on the coordinate axis "Y—Y". The shading member 11 is a board member having a uniform width w (1.50 mm in this embodiment). Accordingly, a shading ratio, i.e., the ratio of the surface area of the shading member 11 to the area of the slit image (for example, "P", "Q", or "R") is high when the slit image is small, and therefore the light amount at the reduced copying does not increase in comparison to that at the equal-sized or magnified copying. Namely, assuming that the light amount is 100 at the longitudinal center of the projected slit image on the surface of the photoconductive drum 3 at the equal-sized copying, the light amount increases at about 4 percent at the magnified copying with the shading member 11 as shown in FIG. 6. At reduced copying, the light amount increases by about 11 percent without the shading member as shown in FIG. 8, but by only about 4 percent with the shading member 11 as shown in FIG. 6.

Figure 5:
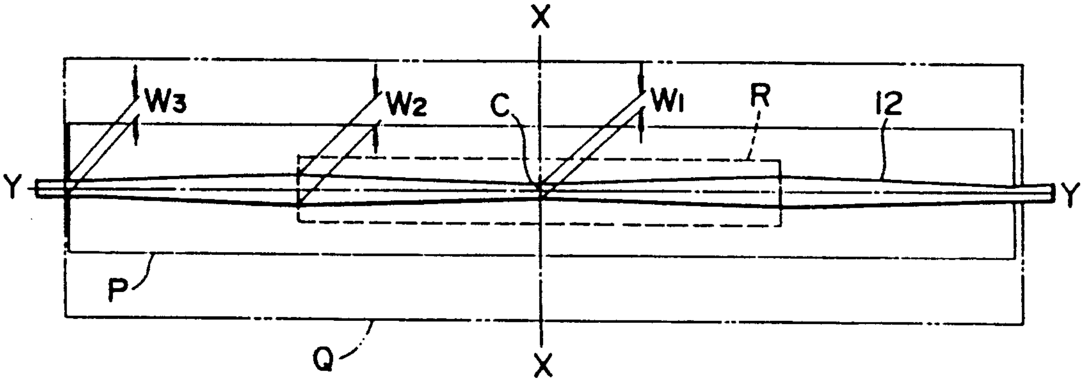
FIG. 5 shows a plan view of a modified shading member.

FIG. 5 shows a plan view of a modified shading member 12. In this modification, the shape of the shading member 12 is different from that of the shading member 11.

The shading member 12 is located on the axis "Y—Y", and its width varies in its longitudinal direction. That is, the width is relatively small at the crossing point "C" as well as at the longitudinal edges while it gradually increases in the intermediate area and decreases therefrom between the adjacent small width portions. More particularly, the width w2 at the edges in the direction of the axis "X—X" of the slit image "R", which represents half-sized copying, is larger than the width w1, whereby the shading ratio at both longitudinal edges of the projected slit image "R" becomes higher than that at the center of the optical axis at the reduced copying width w3 at both longitudinal edges of the projected image "P" drawn with solid lines, which represents equal-sized copying is formed to be same as the width w1. In this embodiment, w1 and w3 are 1.50 mm, respectively, and w2 measures 2.25 mm.

Consequently, at the edges in the direction of the axis "Y—Y" of the projected slit image "R" for half-sized copying, the light amount which is high at the longitudinal edges at the half-sized copying, is shaded with the portion of the width w2 of the shading member 12. While, in the center portion of the slit image "R" including the crossing point "C", the light is shaded with the portion of the width w1. Since the shaded light amount is smaller than that at the longitudinal edges of the slit image, the light amount at the crossing point "C" and at the edge of the slit image "R" become more uniform; thus, light amount correction is achieved.

On the other hand, for equal size of magnified copying, the wider portion of the shading member 12 shades the slit image "P" and "Q". In this case, however, the slit image "P" or "Q" is wider than R. Thus the effect of the reduction of the light amount on the slit image "P" or "Q" is relatively less than to the slit image "R", which causes no problem.

In the above modification, in order to reduce the effect described above, the shading member 12 is formed in such a manner that the width thereof is gradually lessened from the wide portion of the width w2 to the narrow portions of the width w1, w2, respectively.

Figure 7:
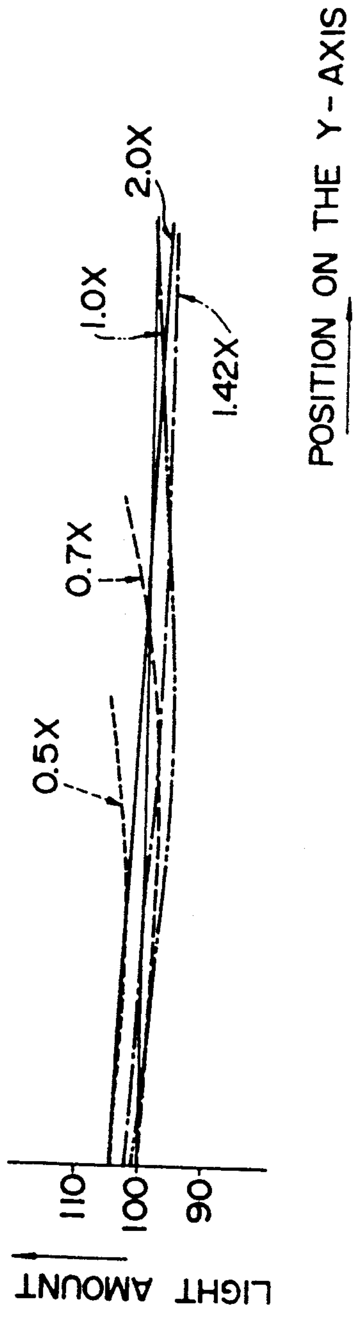
FIG. 7 is a graph showing light distribution characteristics at each magnification ratio of images when employing the shading member shown in FIG. 5.

FIG. 7 shows the light distribution in the longitudinal direction of the photoconductive drum 3 utilizing the light shading member 12 at each copying magnification, i.e. magnified, reduced and equal-sized, wherein the light amount is set 100 at the longitudinal center of the projected image "P" on the circumferential surface of the photoconductive drum 3 for equal-sized copying.

Comparing FIG. 7 with FIG. 9 which does not employ the light shading member, the variation between the maximum light amount and the minimum light amount is 33 percent with no light shading member, while it is 10 percent with a light shading member 12. Thus, the nonuniformity of the light distribution is substantially corrected by employing the light shading member 12.

With this light shading member 12, the increase of the light amount at the reduced copying can be corrected as well as with the light shading member 11 explained earlier.

Although the light shading members 11, 12 are illustrated to be disposed adjacent to the circumferential surface of the photoconductive drum 3 in the aforementioned embodiments, the invention is not limited to the these embodiments. However, when the light shading member is employed, it is desirable to satisfy the following inequality:

$$X/V<0.1$$

where

V: a distance between the original subject and the circumferential surface of the photoconductive drum; and X: a distance between the shading member and the circumferential surface of the photoconductive drum.

Although in embodiments described above, the shading member is disposed to cross the optical axis, the shading member may be disposed in a position where it is in the area of the slit image at the reduced copying, because the effect of the correction is similar whether it is on the optical axis or not.

The light shading member according to the invention does not require a high precision in construction, which facilitates the manufacturing thereof.

The copying apparatus according to the invention set forth above is capable of efficiently correcting the amount of light of the projected slit image on the circumferential surface of the photoconductive drum depending upon the magnifying power. This results from the light shading member being fixed to shade the projected image on the circumferential surface of the photoconductive drum and from the shading ratio of the shading member to the slit image increases as the slit image lessens in size.

Moreover, since the shading member according to the invention is fixed adjacent to the surface of the photoconductive drum in the longitudinal direction thereof, no driving means for driving to move the shading member is necessary.

By setting the shading ratio higher at the edges in the longitudinal direction of the projected slit image than at the center of the optical axis, the nonuniformity in the brightness of the longitudinal edges of the slit image, especially at the reduced copying, is sufficiently corrected.

What is claimed is:

1. An electrophotographic copying apparatus wherein light reflected from an original subject is directed to a light receiving means through slit, which comprises:

optical means provided between said original subject and said light receiving means for varying the size of the reflected light being passed through said slit; and a shading member, positioned within the width of reflected light passing through said slit and fixed at a predetermined positioned between said optical means and said light receiving means along a longitudinal direction of said optical image.

2. The copying apparatus according to claim 1, wherein said shading member comprises a board member, and said light receiving means comprises a photoconductive drum having an axis; and wherein said board member is extends parallel to the axis of said photoconductive drum.

3. The copying apparatus according to claim 2, wherein said board member is formed with a uniform width.

4. The copying apparatus according to claim 2, wherein the width of said board member is relatively small at its longitudinal center as well as its longitudinal edges and is relatively wide at the portions corresponding to the longitudinal edges of said optical image at the minimum magnifying power of said optical means; and wherein the width of said board member gradually increases up to said portions from said longitudinal center and decreases therefrom toward said longitudinal edges of said board member.

5. The copying apparatus according to claim 4, wherein the width of said board member at said longitudinal center is equal to that at each of said longitudinal edges of said board member.

6. The copying apparatus according to claim 1, wherein a distance between said shading member and the surface of said light receiving means is set to be less than ten percent of the distance between the surface of said light receiving means and the original subject.

7. A shading device for an electrophotographic copying apparatus wherein light reflected from an original is directed through a slit and an optical image size varying means and onto a light receiving means, said device comprising a shading member positioned within the width of the light passing through the slit and located at a predetermined position between the optical image size varying means and the light receiving means along a longitudinal direction of the optical image.

* * * * *